(12) United States Patent
Nedbal et al.

(10) Patent No.: US 10,826,916 B2
(45) Date of Patent: Nov. 3, 2020

(54) AGENT-LESS NETWORK TRAFFIC INSPECTION USING AN OVERLAY NETWORK

(71) Applicant: ShieldX Networks, Inc., San Jose, CA (US)

(72) Inventors: Manuel Nedbal, Santa Clara, CA (US); Ratinder Paul Singh Ahuja, Saratoga, CA (US); John Richard Guzik, Sunnyvale, CA (US)

(73) Assignee: SHIELDX NETWORKS, INC., San Jose, CA (US)

(*) Notice: Subject to any disclaimer, the term of this patent is extended or adjusted under 35 U.S.C. 154(b) by 227 days.

(21) Appl. No.: 16/133,535

(22) Filed: Sep. 17, 2018

(65) Prior Publication Data

US 2020/0092307 A1  Mar. 19, 2020

(51) Int. Cl.
*H04L 29/06*   (2006.01)

(52) U.S. Cl.
CPC ...... *H04L 63/1408* (2013.01); *H04L 63/1416* (2013.01)

(58) Field of Classification Search
CPC .................................................. H04L 63/1408
See application file for complete search history.

(56) References Cited

U.S. PATENT DOCUMENTS

| | | | | |
|---|---|---|---|---|
| 5,940,394 A * | 8/1999 | Killian | ............. | H04L 12/66 370/393 |
| 6,473,426 B1 * | 10/2002 | Killian | ............. | H04L 12/66 370/393 |
| 6,553,377 B1 * | 4/2003 | Eschelbeck | ............. | G06F 21/50 |
| 6,567,808 B1 * | 5/2003 | Eschelbeck | ............. | G06F 9/465 |
| 7,200,862 B2 * | 4/2007 | Murching | ............. | H04L 63/101 709/224 |
| 7,979,895 B2 * | 7/2011 | Farrell | ............. | G06F 21/6218 726/4 |
| 8,151,360 B1 * | 4/2012 | Kishore | ............. | G06F 21/604 709/202 |
| 8,543,726 B1 * | 9/2013 | Kann | ............. | H04L 63/0281 709/219 |
| 9,374,417 B1 * | 6/2016 | Greenfield | ............. | G06F 11/0787 |
| 9,641,434 B1 * | 5/2017 | Laurence | ............. | H04L 45/7453 |
| 9,838,302 B1 * | 12/2017 | Sears | ............. | H04L 45/28 |
| 10,048,996 B1 * | 8/2018 | Bell | ............. | G06F 11/3452 |
| 10,057,267 B1 * | 8/2018 | Miller | ............. | H04L 63/10 |

(Continued)

OTHER PUBLICATIONS

International Search Report and Written Opinion, PCT App. No. PCT/US2019/051525, dated Nov. 28, 2019, 10 pages.

*Primary Examiner* — Bradley W Holder
(74) *Attorney, Agent, or Firm* — Nicholson De Vos Webster & Elliott LLP

(57) ABSTRACT

Systems, methods, and apparatuses enable agent-less network traffic interception using an overlay network. The system creates an inspection namespace on a server computer and clones namespace properties of a default namespace on the server computer to the inspection namespace. The system creates an overlay network in the inspection namespace connecting the server computer to a security service. The system creates a namespace bridge between the default namespace and the inspection namespace to pass server traffic between the namespaces. The system then transmits server traffic to the security service using the overlay network and an encapsulation protocol.

15 Claims, 13 Drawing Sheets

(56) References Cited

U.S. PATENT DOCUMENTS

| | | | |
|---|---|---|---|
| 10,075,459 B1* | 9/2018 | Suryanarayanan | H04L 63/0272 |
| 10,127,066 B1* | 11/2018 | Sethuramalingam | G06F 9/45558 |
| 10,148,736 B1* | 12/2018 | Lee | H04L 67/1097 |
| 10,182,104 B1* | 1/2019 | Canton | H04L 67/10 |
| 10,218,597 B1* | 2/2019 | Miller | H04L 43/0876 |
| 10,237,157 B1* | 3/2019 | Sears | H04L 43/10 |
| 10,270,668 B1* | 4/2019 | Thompson | H04L 41/5009 |
| 10,318,265 B1* | 6/2019 | To | G06F 8/61 |
| 10,318,320 B1* | 6/2019 | Thomas | H04L 67/025 |
| 10,326,710 B1* | 6/2019 | Hashmi | H04L 47/783 |
| 10,397,051 B1* | 8/2019 | Featonby | H04L 41/08 |
| 10,445,197 B1* | 10/2019 | Harpreet | H04L 41/0654 |
| 10,552,796 B1* | 2/2020 | Delacourt | G06Q 10/06 |
| 10,558,482 B1* | 2/2020 | Miller | H04L 61/2514 |
| 10,567,334 B1* | 2/2020 | Venkatesan | G06N 5/04 |
| 10,572,842 B1* | 2/2020 | To | G06Q 30/00 |
| 10,592,475 B1* | 3/2020 | Ghidireac | G06F 16/14 |
| 10,659,523 B1* | 5/2020 | Joseph | H04L 67/10 |
| 10,680,969 B1* | 6/2020 | Quinn | G06F 9/45558 |
| 10,684,888 B1* | 6/2020 | Sethuramalingam | G06F 11/203 |
| 2004/0064721 A1* | 4/2004 | Murching | H04L 63/101 726/1 |
| 2009/0049524 A1* | 2/2009 | Farrell | H04L 29/12066 726/4 |
| 2013/0287022 A1 | 10/2013 | Banavalikar et al. | |
| 2015/0006896 A1* | 1/2015 | Franck | H04L 65/1069 713/171 |
| 2016/0344687 A1* | 11/2016 | Rong | H04L 61/2015 |
| 2018/0062923 A1* | 3/2018 | Katrekar | H04L 41/0806 |
| 2018/0063087 A1 | 3/2018 | Hira et al. | |
| 2018/0063193 A1* | 3/2018 | Chandrashekhar | H04L 49/70 |
| 2019/0052598 A1* | 2/2019 | Hira | H04L 61/2007 |

* cited by examiner

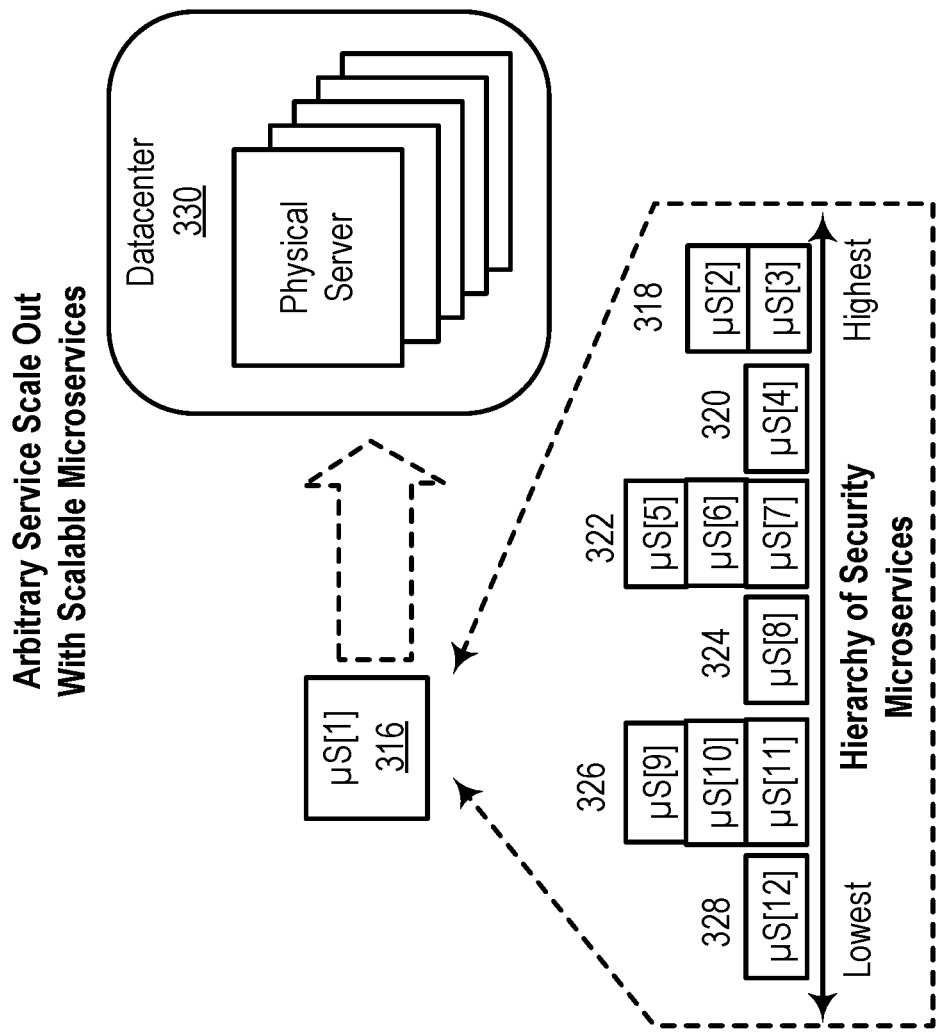
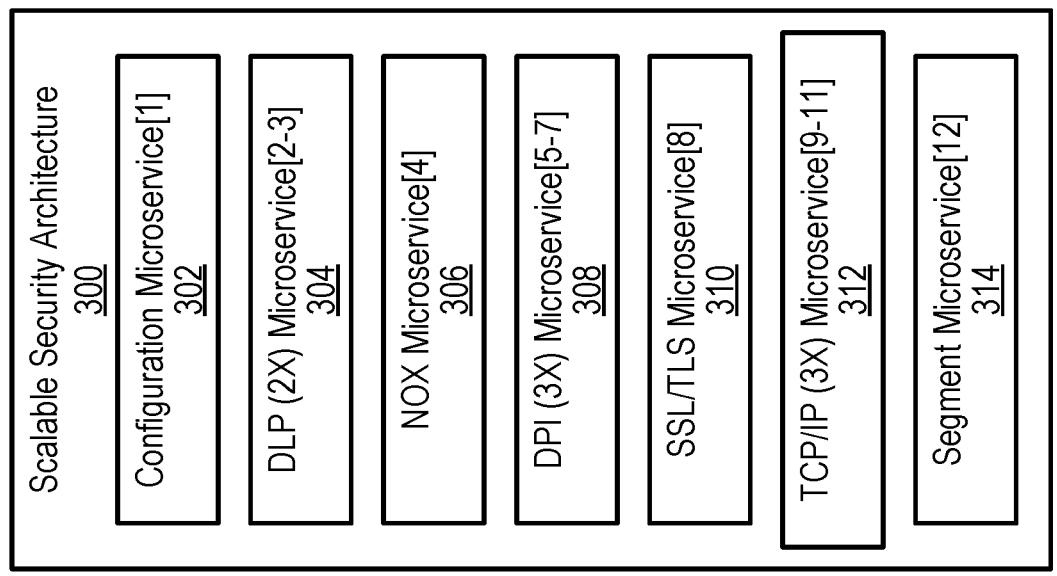
FIG. 3

```
1   post-up si=10.23.2.22; \
2   addr=$(ip -o -4 addr show dev ${IFACE} | awk '{print $4}'); \
3   ether=$(ip -o link show dev ${IFACE} | awk '{print $17}'); \
4   mtu=$(( $(ip -o link show dev eth1 | awk '{print $5}') - 50 )); \
5   ip netns add s${IFACE}; \
6   ip netns exec s${IFACE} sysctl -q -w net.ipv6.conf.all.disable_ipv6=1; \
7   ip netns exec s${IFACE} sysctl -q -w net.ipv6.conf.default.disable_ipv6=1; \
8   ip link set dev ${IFACE} netns s${IFACE}; \
9   ip link add dev ${IFACE} type veth peer name v${IFACE}; \
10  ip link set dev v${IFACE} netns s${IFACE}; \
11  ip link set dev ${IFACE} addr ${ether}; \
12  ip addr add dev ${IFACE} ${addr}; \
13  ip link set dev ${IFACE} mtu ${mtu}; \
14  ip link set dev ${IFACE} up; \
15  ip netns exec s${IFACE} ip link add dev b${IFACE} type bridge; \
16  ip netns exec s${IFACE} ip link set dev b${IFACE} up; \
17  ip netns exec s${IFACE} ip link set dev v${IFACE} master b${IFACE}; \
18  ip netns exec s${IFACE} ip link set dev v${IFACE} up; \
19  ip netns exec s${IFACE} ip link add dev x${IFACE} type vxlan id 100 dstport 8472 port 8472 8472 dev ${IFACE}; \
20  ip netns exec s${IFACE} ip link set dev x${IFACE} master b${IFACE}; \
21  ip netns exec s${IFACE} ip link set dev x${IFACE} up; \
22  ip netns exec s${IFACE} ip addr add dev ${IFACE} ${addr}; \
23  ip netns exec s${IFACE} ip link set dev ${IFACE} up; \
24  ip netns exec s${IFACE} bridge fdb append to 00:00:00:00:00:00 dst ${si} dev x${IFACE}; \
```

FIG. 11

AGENT-LESS NETWORK TRAFFIC INSPECTION USING AN OVERLAY NETWORK

TECHNICAL FIELD

Embodiments described herein generally relate to network security. Embodiments described herein generally relate to systems and methods for agent-less network traffic interception using an overlay network.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

FIG. 3 illustrates an arbitrary scaling out of a microservice in accordance with the disclosed embodiments;

FIG. 11 is an example script for configuring an overlay network and namespace bridge in accordance with an embodiment;

DETAILED DESCRIPTION

Figure 1:
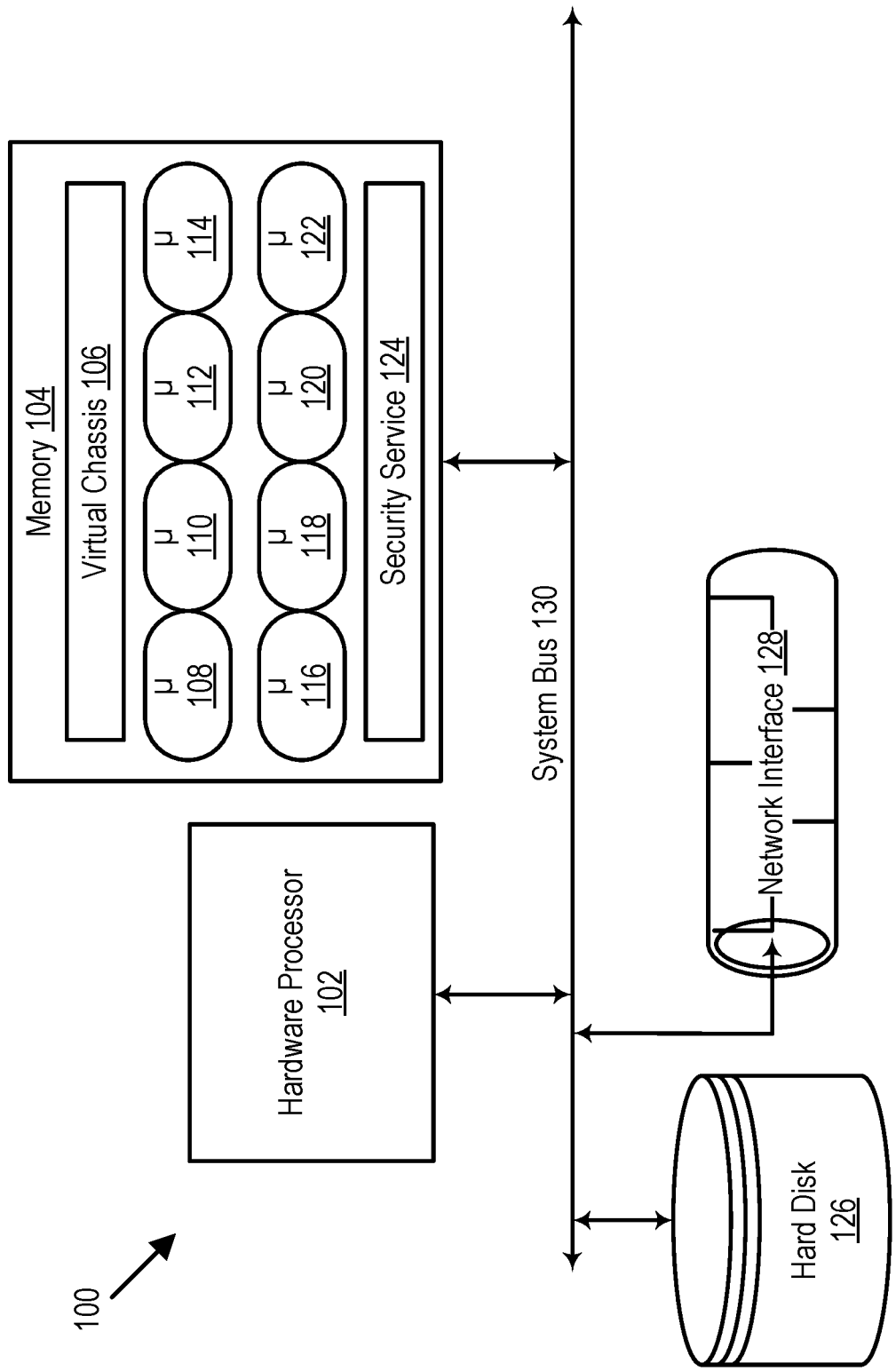
FIG. 1 is a block diagram of a network security system illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to monitor network traffic for potentially bad or malicious network traffic, a security system utilizing a plurality of security microservices can be implemented. In typical systems, the security system can spawn or initialize components (e.g., security microservices) that perform security analyses of the network traffic. However, deficiencies of existing security solutions become apparent from the typical structure of security microservices. For example, some existing security solutions require a security service to install at least one agent (e.g., an interface microservice) in every server to route the network traffic to security microservices. However, given a system with n servers, deploying an agent to each server would require n agents, each needing a unique IP address and connection to a network, via a gateway. In existing security solutions, as the number of servers in the system increases, the number of agents required to support transport of traffic to a security system increases, thereby requiring significant resources to support an increasing number of IP addresses.

To address the deficiencies of existing security infrastructures, embodiments detailed herein use an inspection namespace within a server to handle security processing of network or server traffic. The inspection namespace includes namespace properties cloned from a default namespace within the server, including an IP address and an interface name. The inspection namespace receives network traffic generated in the default namespace via a namespace bridge that redirects the network traffic to the inspection namespace. The inspection namespace receives the network traffic at an overlay network element. The overlay network encapsulates the network traffic with an overlay ethernet header and IP header and transmits the encapsulated network traffic to an overlay network element in a security service. The overlay network sends the encapsulated network traffic with a source IP address of the inspection namespace and a destination IP address of the security service. In contrast to systems that deploy agents (e.g., interface microservices), each having their own unique IP addresses, on every server generating network traffic desired for inspection by a security service, by utilizing an inspection namespace that uses the cloned properties of a default namespace, including the IP address of the default namespace, and an overlay network, installing agents with unique IP addresses on each server is not required. This allows embodiments to analyze a network environment and protect the network environment from malicious traffic, while utilizing a reduced amount of computing resources.

For example, some embodiments detailed herein utilize a server computer to create an inspection namespace with cloned namespace properties from a default namespace on the server computer. The server computer creates an overlay network in the inspection namespace to connect the inspection namespace on the server computer to a security service. The server further creates a namespace bridge between the default namespace and the inspection namespace to redirect network traffic generated in the default namespace to the inspection namespace. The server computer utilizes the overlay network to transmit encapsulated server traffic to the security service for inspection of the network traffic.

Other embodiments described herein utilize a server computer to create an inspection namespace for a security service that is deployed on the inspection namespace. The server computer creates an overlay network in the inspection namespace, that is configured to carry encapsulated network traffic between the security service and a source of the network traffic. The server computer receives the encapsulated network traffic from a first namespace in the source of the server traffic, where the first namespace receives the server traffic from a second namespace in the source of the server traffic. After receiving the encapsulated network traffic via the overlay network, the server computer decapsulates the network traffic and performs security processes for inspection of the network traffic.

FIG. 1 is a block diagram of network security system 100 illustrating computer hardware, including a memory (e.g., 104) and processor (e.g., 102), in accordance with the disclosed embodiments. Network security system 100 further includes a hard disk (e.g., 126) and network interface 128. In one embodiment, hardware processor, memory 104, hard disk 126, and network interface 128 are coupled to each other via a system bus (e.g., 130). Network security microservices 108-122 are stored in memory 104 (e.g., volatile memory such as Random-Access Memory (RAM) and/or non-volatile memory such as solid-state storage or disk) and executed by one or more processor cores or hardware processors 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security policies (e.g., access control lists), and otherwise protect a data center using the microservices 108-122.

Embodiments of network security system 100 providing the above capabilities are now discussed in more detail. Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to utilize a plurality of microservices to manage the initialization of other security microservices on a computing device (e.g., servers) to prevent potentially bad or malicious network traffic from being transmitted from an untrusted network (e.g., the internet) to trusted network resources, and between trusted network resources. In one embodiment, security service 124 prevents or reduces the risk of malicious network traffic from accessing trusted network resources and from being communicated between trusted network resources by identifying all or a subset of communication paths and deploying security policies on the servers on the identified communication paths. In one embodiment, the processes disclosed herein are performed by security service 124. In other embodiments, the processes disclosed herein are performed by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts but does not block the data. Hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis.

Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
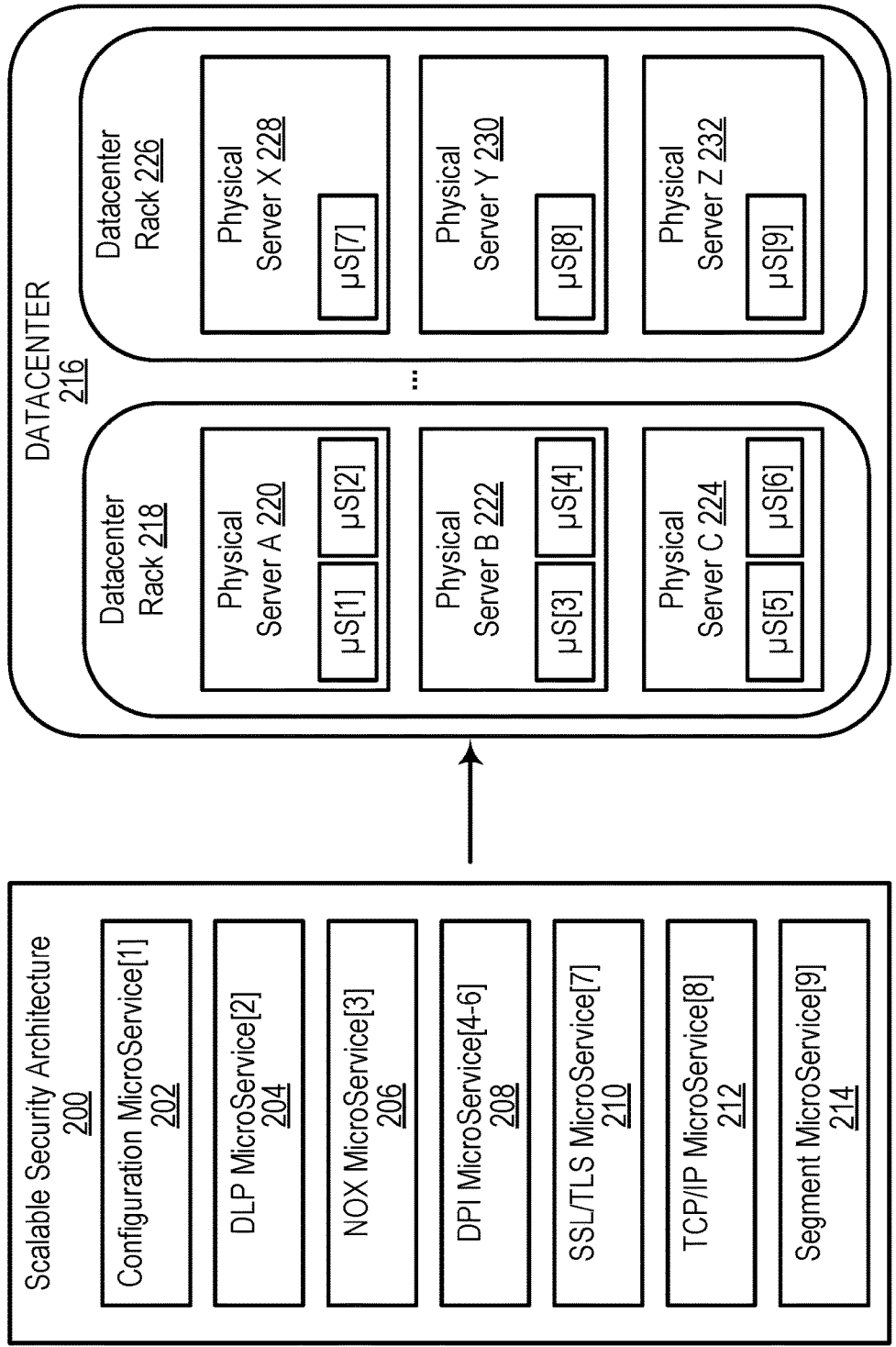
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy and configures them to communicate with each other via a backplane. The microservices, for example, may be implemented by physical servers in datacenter 330.

Figure 4:
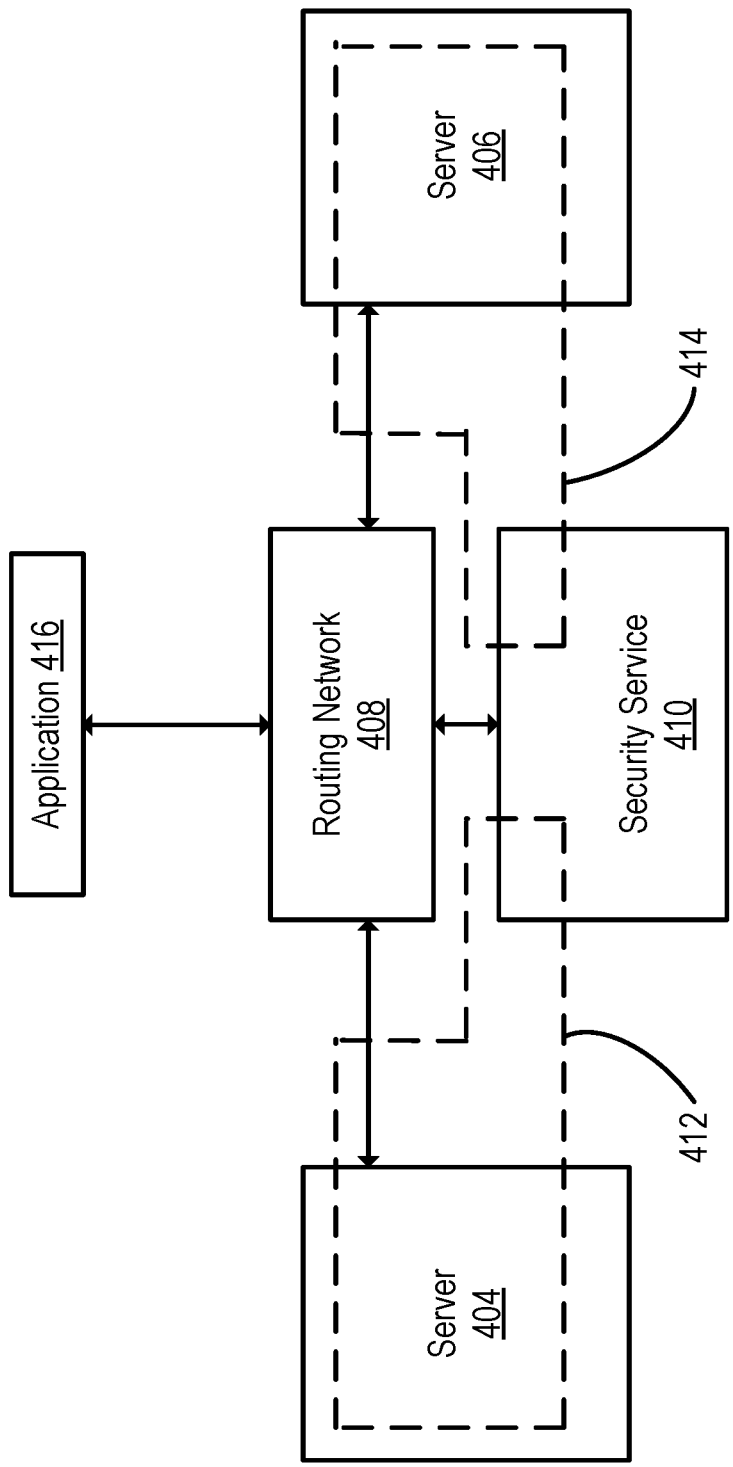
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between application 416 and one or more servers 404 and 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404 and 406. The microservices comprising security service 410 do not need to be confined to one physical server such as a server 404 and 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404 and 406, security service 410, and application 416 are deployed in a networked environment. Examples of networked environments include data centers, an on-premise stack, and a set of servers remotely connected using a network.

In one embodiment, a routing network 408 provides connectivity among servers 404 and 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
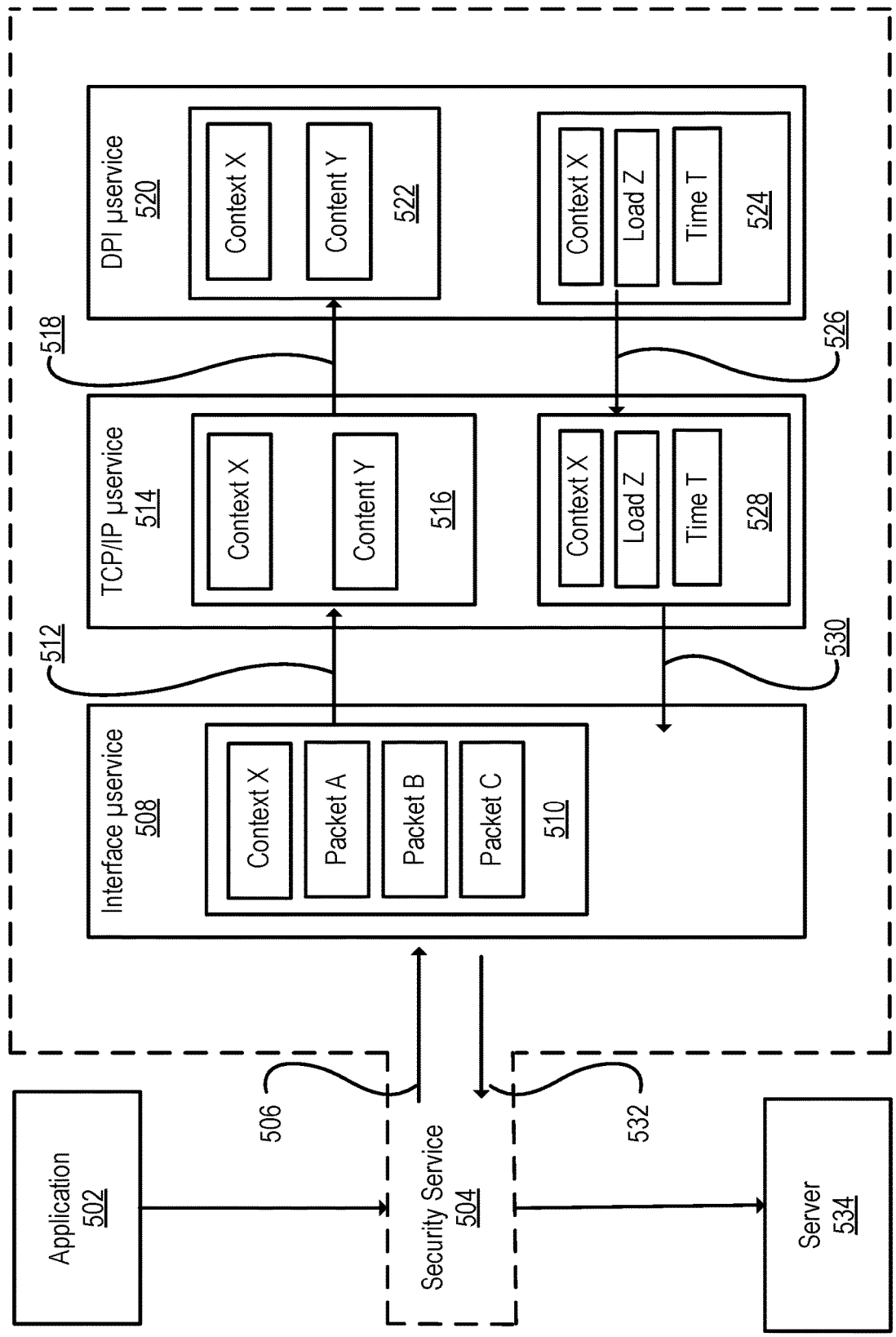
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. In one embodiment, security service 504 is an example of security service 124 in FIG. 1. Security service 504 receives the packet (e.g., from an application or program that redirects packets to security service 504), and security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via transmission paths 526 and 530, the microservices receive and can maintain real-time loading and processing latency information utilized to make load balancing decisions.

Figure 6:
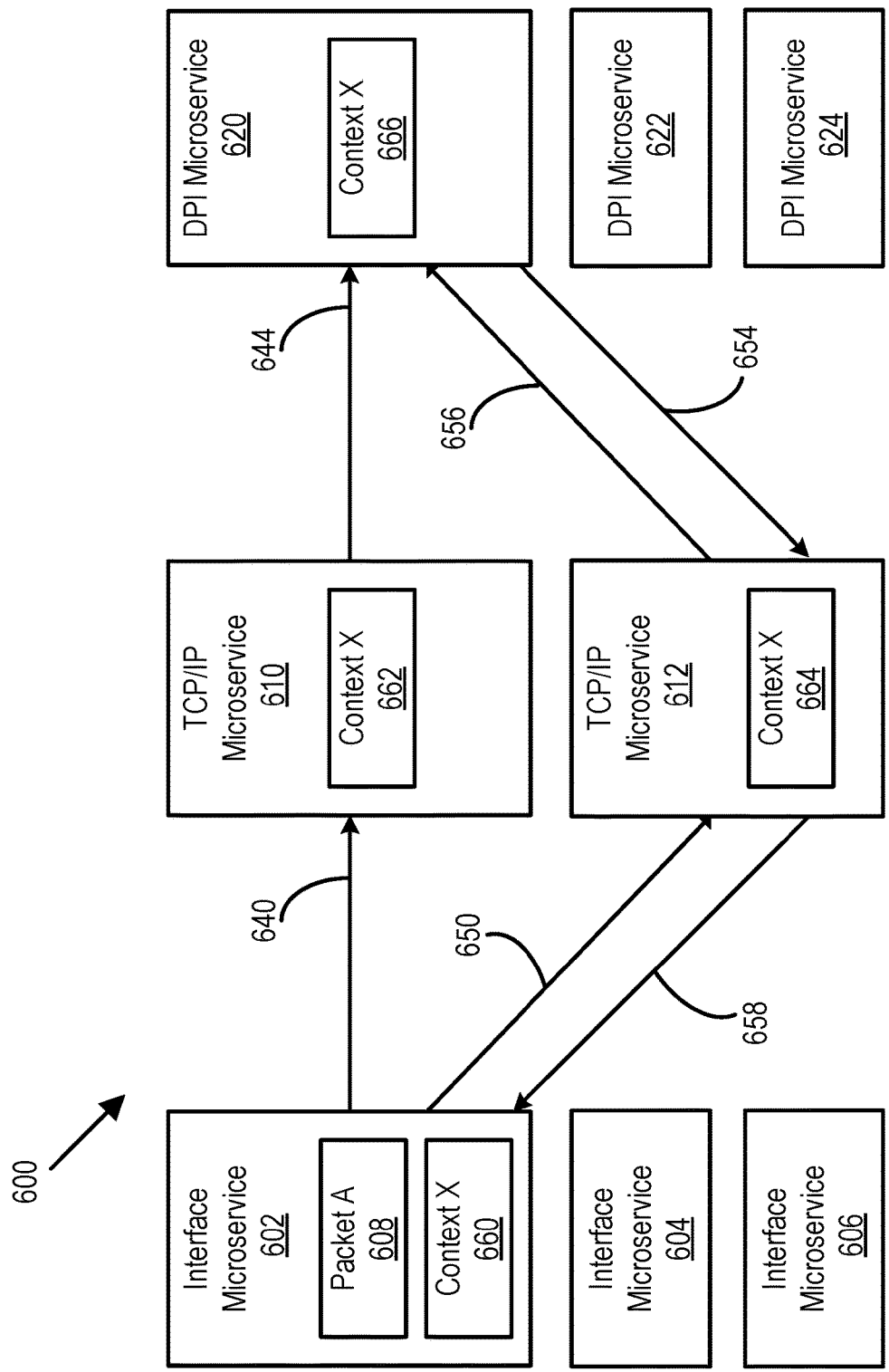
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices and/or a different number of microservice types. In one embodiment, security system 600 is an example of security service 124 in FIG. 1. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission path 640. Context X 662, when transmitted to DPI microservice 620 as part of transmission path 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and a state lookup or a context lookup, in addition to other information. Interface microservice 602 provides packet A 608 and context X 660 to TCP/IP microservice 610 or 612 via transmission paths 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via transmission paths 644 or 656, respectively. Along with the transmitted data, TCP/IP microservice 610 or 612 forwards context X 662 or 664, respectively, to DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via transmission path 650. TCP/IP microservice 612 performs some security processing, then transmits the second packet and context X 664 to DPI microservice 620 via transmission path 656. After performing some security processing, DPI microservice 620 responds to TCP/IP microservice 612 via transmission path 654, and TCP/IP microservice responds to interface microservice 602 via transmission path 658.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
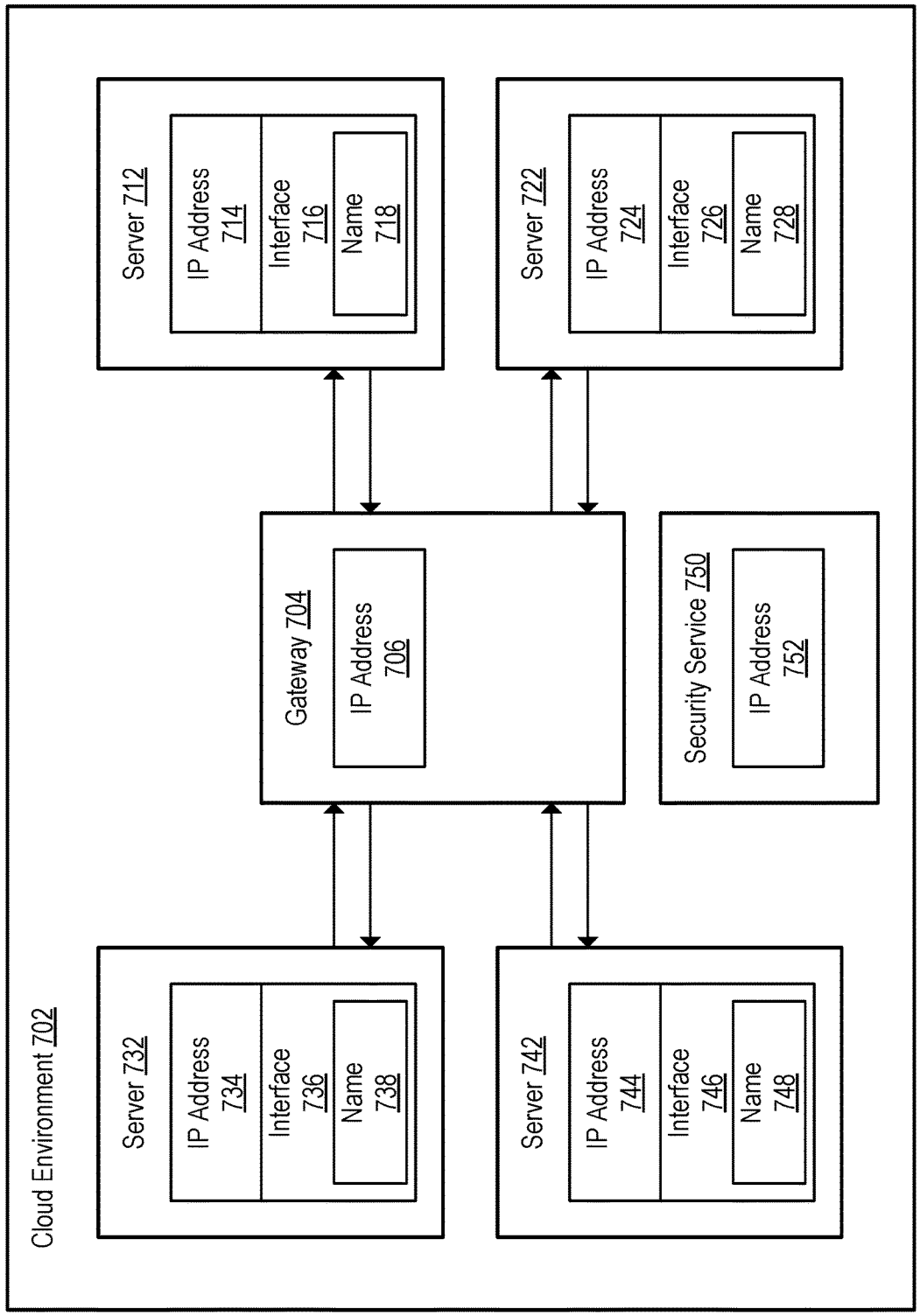
FIG. 7 is a block diagram illustrating an example environment with a security service configurable to intercept network traffic in accordance with the disclosed embodiments.

FIG. 7 is a block diagram illustrating an example environment with a security service configurable to intercept network traffic in accordance with the disclosed embodiments. In one embodiment, cloud environment 702 includes servers (e.g., servers 712, 722, 732, and 742), which can be physical or virtual. Cloud environment 702 includes security service 750, which has IP address 752. In one embodiment, security service 750 is an example of security service 124 in FIG. 1. As depicted in FIG. 7, servers 712, 722, 732, and 742 can communicate with the external environment (e.g., outside cloud environment 702) via gateway 704 and with each other via the routing capabilities of cloud environment 702. Gateway 704 includes IP address 706. In one embodiment, gateway 704 enables the servers to communicate outside of cloud environment 702 and provides routing services (such as ARP) allowing communication within cloud environment 702. Server 712 includes an IP address 714 and an interface 716 with a name 718. Similarly, server 722 includes an IP address 724 and an interface 726 with a name 728, server 732 includes an IP address 734 and an interface 736 with a name 738, and server 742 includes an IP address 744 and an interface 746 with a name 748. In one embodiment, the servers are on a same local area network (LAN) segment, such that the IP addresses 714, 724, 734, and 744, have a same IP prefix as gateway 704 (e.g., 192.168.1.XX). In one embodiment, the interfaces 716, 726, 736, and 746, are ethernet interfaces that allow the corresponding server to communicate with gateway 704.

Some security systems are implemented at the gateway level. For example, network traffic received by gateway 704 from servers 712, 722, 732, and 742, or sent from gateway 704 to servers 712, 722, 732, and 742, is directed by gateway 704 to security service 750. However, there is no inspection of network traffic between the individual servers within cloud environment 702. To address the security of network traffic between the individual servers within cloud environment 702, agents (e.g., interface microservices) can be installed on every server to ensure that all network traffic sent from any server is redirected to security service 750 for inspection. Such agents typically require additional VLANs or IP addresses to be configured to support the inspection of traffic between servers.

Figure 8:
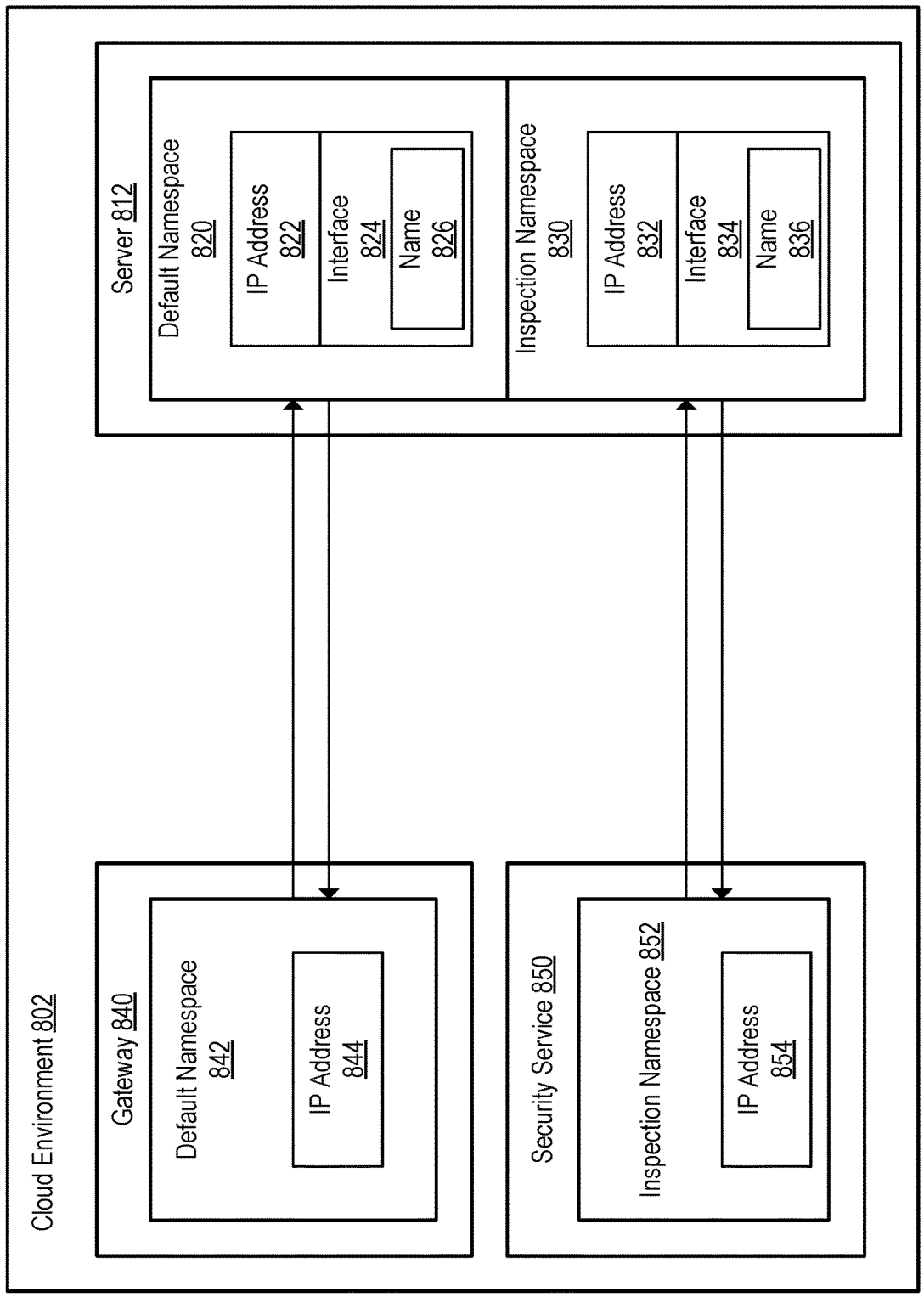
FIG. 8 is a block diagram illustrating an environment with a security service configured to intercept network traffic routed in accordance with the disclosed embodiments.

FIG. 8 is a block diagram illustrating an environment with a security service configured to intercept network traffic routed in accordance with the disclosed embodiments. In one embodiment, cloud environment 802 includes server 812, gateway 840, and security service 850. In one embodiment, security service 850 is an example of security service 124 in FIG. 1. In FIG. 8, server 812 includes a default namespace 820 that includes IP address 822 and interface 824 with name 826, and inspection namespace 830 that includes IP address 832 and interface 834 with name 836. In server 812, the use of namespaces isolates the behaviors of programs and applications operating in default namespace 820 from the behaviors of programs and applications operating in inspection namespace 830. Gateway 840 includes default namespace 842 and IP address 844, and security service 850 includes inspection namespace 852 and IP address 854. Default namespace 820 is different (in name) from inspection namespace 830 as both namespaces exist within server 812. Embodiments wherein the servers supporting the functionality of gateway 840 and security service 850 are distinct have no requirements regarding the names of the corresponding namespaces default namespace 842 and inspection namespace 852.

In accordance with the disclosed embodiments, the configuration of server 812 in FIG. 8 using default namespace 820 and inspection namespace 830 allows IP addresses 822 and 832 to be the same IP address, and allows interfaces 824 and 834 to have the same interface names 926 and 936, respectively. Without additional elements of the present invention discussed in subsequent diagrams, configuring server 812 as depicted in FIG. 8 may introduce packet routing issues. While packets can be sent from default namespace 820 and inspection namespace 830 to their intended destination, gateway 840 and security service 850 cannot distinguish which namespace to direct return packets because they have the same IP address. This problem occurs because IP or Ethernet levels of the OSI stack (Layers 3 and 2 respectively) have no knowledge of namespaces. For example, assuming IP addresses 822 and 832 are both 192.168.1.12 and gateway 840 has IP address 844 of 192.168.1.40, one or both of default namespace 820 and inspection namespace 830 can send a packet to gateway 840 using their corresponding interfaces, 824 and 834, respectively. In this example, gateway 840 can send the packet to the intended destination (e.g., outside cloud environment 802). However, when gateway 840 receives a return packet with a destination IP address of 192.168.1.12, gateway 840 does not know (and has no basis) whether the return packet should be directed to default namespace 820 or inspection namespace 830 in server 812.

Figure 9:
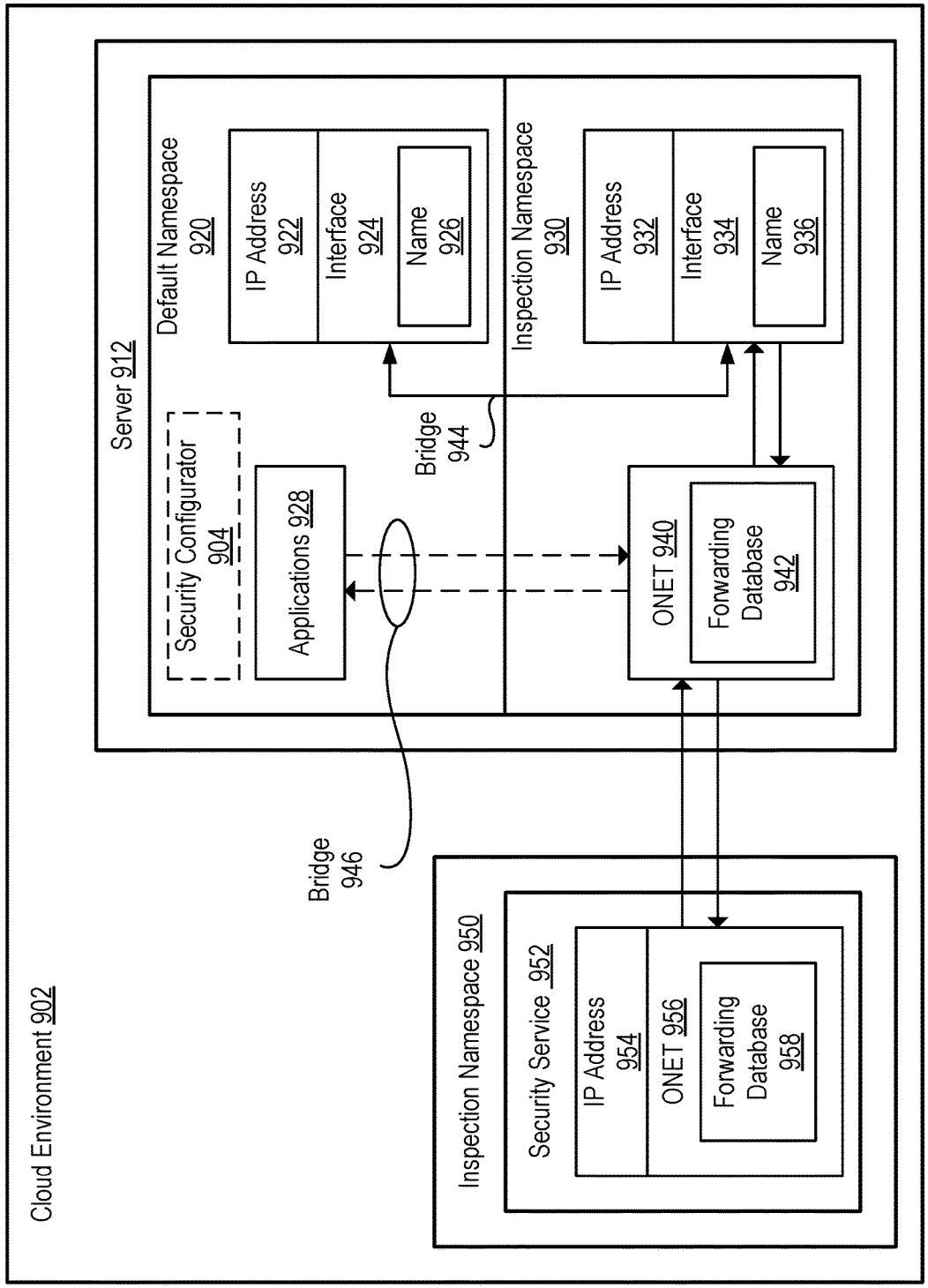
FIG. 9 is a block diagram illustrating an example environment with a security service configured to intercept network traffic received via an overlay network in accordance with the disclosed embodiments.

FIG. 9 is a block diagram illustrating an example environment with a security service configured to intercept network traffic received via an overlay network in accordance with the disclosed embodiments. Furthermore, FIG. 9 illustrates elements of the present invention that overcome the issues described with regards to FIG. 8. In one embodiment, cloud environment 902 includes server 912 and inspection namespace 950. In FIG. 9, server 912 includes a default namespace 920 that includes IP address 922 and interface 924 with name 926, and inspection namespace 930 that includes IP address 932 and interface 934 with name 936. Default namespace 920 can also include applications 928. In some embodiments, applications 928 include applications such as web servers, application processors and databases communicate with other applications and/or servers using TCP/IP to provide services to users outside cloud environment 802. In some embodiments, server 912 includes security configurator 904. In one embodiment, security configurator 904 instructs server 912 to perform steps as embodied in FIG. 10.

In one embodiment, inspection namespace 930 includes an encapsulating element, overlay network (ONET) 940, that includes forwarding database 942. In one embodiment, forwarding database 942 handles the forwarding of encapsulated packets to security service 952 and the forwarding of decapsulated packets to default namespace 920. In other embodiments, forwarding database 942 sends the encapsulated packets outside of cloud environment 902 to another environment, including other environments hosting security services. The encapsulation and decapsulation services provided by ONET 940 provide an overlay network that can route packets with arbitrary content to a security service using the IP address 932 of inspection namespace 930 as a source IP and the IP address 954 of the security service 952 as a destination IP. In one embodiment, the IP traffic generated by ONET 940 is distinguishable from the traffic generated by applications 928 (even though they have the same IP addresses) by the former's layer 4 port number (such as a specified UDP port number).

The encapsulating element ONET 940 can use any suitable encapsulation such as Virtual Extensible LAN (VXLAN), Generic Routing Encapsulation (GRE) Tunnels or proprietary protocols. In one embodiment, inspection namespace 950 includes security service 952 that includes IP address 954 and ONET 956, which includes forwarding database 958. As above, ONET 956 is an example of a type of encapsulating element, and other embodiments contemplate the use of multiple types of encapsulating elements. In one embodiment, security service 952 is an example of security service 124 in FIG. 1. Encapsulated packets generated by ONET 940 may be sent to security service 952 where they are decapsulated by ONET 956 before being processed by security service 952.

In one embodiment, applications 928 in default namespace 920 communicate with ONET 940 in inspection namespace 930 using bridge 944 between interface 924 in default namespace 920 and interface 934 in inspection namespace 930. In one embodiment, bridge 944 is a routing directive or configuration that is applied to traffic within server 912. In one embodiment, bridge 944 is equivalent to a layer 1 connection, e.g., a virtual ethernet cable between interface 924 of default namespace 920 and interface 934 of inspection interface 930. For example, data packets that are directed to interface 924 within default namespace 920 will trigger the routing directive, and automatically forward the data packets to inspection namespace 930 for ONET 940 encapsulation. The creation of such routing configurations between namespaces is understood by those of ordinary skill in the art with an example script provided in the description of FIG. 10. In some embodiments, from a standpoint of applications 928, the bridge between default namespace 920 and inspection namespace 930 can be represented by bridge 946 between applications 928 and ONET 940.

ONET 940 is located between inspection namespace 930 and security service 952 and encapsulates data packets for transmission via an overlay network. In such embodiments, the use of ONET 940 allows server 912 to reuse a single IP address multiple times, while also distinguishing between different sources.

As in FIG. 7, IP addresses 922 and 932 in default namespace 920 and inspection namespace 930, respectively, are configurable to have the same IP address, and interfaces 924 and 934 are configurable to have the same interface names 926 and 936, respectively. For example, the IP addresses 922 and 932 for default namespace 920 and inspection namespace 930 is "192.168.1.12" and the interface name for 926 and 936 is "Eth0".

In one embodiment, ONET 940 encapsulates data packets in inspection namespace 930 for inspection by security service 952. In one embodiment, server 912 configures ONET 940 to encapsulate any network traffic that is sent across inspection namespace 930. In this manner, inspection namespace 930 provides the alternative for an agent within default namespace 920 and performs materially the same functions without requiring additional VLANs or IP addresses. ONET 940 uses an encapsulation protocol to encapsulate data packets and uses information in forwarding database 942 to send the encapsulated data packets to a corresponding endpoint in security service 952 using IP address 954 as the destination address. In one embodiment, ONET 940 encapsulates the data packets and assigns an overlay ethernet header and IP header to the encapsulated data packets. Security service 952 receives the encapsulated data packets via ONET 956, which decapsulates the data packets, and allows security service 952 to perform operations to inspect the decapsulated data traffic. Following the inspection, ONET 956 uses information in forwarding database 958 to identify the correct destination IP address of any return packets. Continuing the example above, security service 952 sends an encapsulated return packet with a destination IP address of 192.168.1.12 using ONET 956, and ONET 940 receives the return packet. ONET 940 decapsulates the return packet and the routing directive or configuration causes inspection namespace 930 to transmit the decapsulated packet to applications 928 in default namespace 920 across bridge 944 between interfaces 934 and 924.

By configuring cloud environment 902 as depicted in FIG. 9, security service 952 can perform inspection of data packets to and from applications 928. The inspection can be provided whether the traffic is between arbitrary servers within the network segment, between arbitrary servers within the cloud environment or between the server and any arbitrary entity outside the cloud environment. No additional VLANs or IP addresses must be configured in the cloud environment to allow security service 952 to perform the inspection. Enabling and disabling of inspection may occur on a running system through the enabling and removal (respectively) of bridge 944. Forwarding database 942 may be configured to utilize multiple security services at any routable location and to determine which of applications 928 require inspection of data packets.

Figure 10:
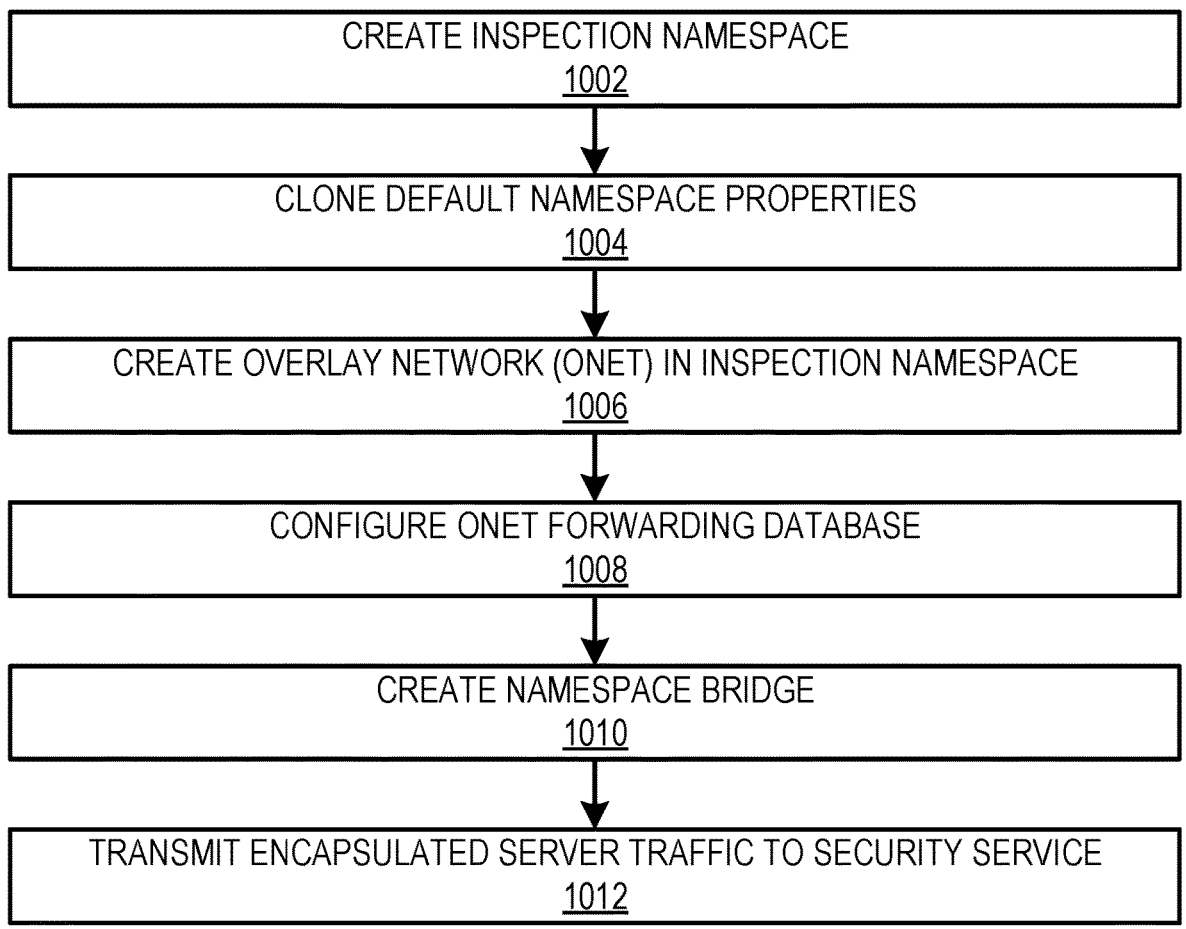
FIG. 10 is a flow diagram illustrating a process for configuring a bridge between namespaces within a server and an encapsulation overlay network for packet inspection in accordance with an embodiment.

FIG. 10 is a flow diagram illustrating a process for configuring a bridge between namespaces within a server and an encapsulation overlay network for packet inspection in accordance with an embodiment. For ease of understanding, the description of FIG. 10 below references components of the networked environments of FIGS. 1 and 9, however, it is not limited to those components. In one embodiment, a security configurator receives instruction to perform the actions described below. In one embodiment, the security configurator is located in security service 124 in FIG. 1. In another embodiment, security configurator 904 is located on server 912 in FIG. 9. In another embodiment, a server (e.g., server 912) receives instructions to perform the actions described below. In other embodiments, a management microservice (e.g., microservice 108-122) receives instructions to perform the actions described below. Further, the actions below may be performed by one or more security microservices at the direction of a management microservice. As such, a single security microservice may perform an action, or two more security services may perform the action either independently, or in conjunction. Although FIG. 10 describes operations performed by a management microservice, some or all of the operations described in FIG. 10 can be performed by a configuration microservice, another type of microservice, an application, or any other computer-executable logic.

At block 1002, a security configurator creates a new namespace in server 912. For example, the security configurator creates inspection namespace 930 in server 912. In one embodiment, the security configurator creates inspection namespace 930 by allocating a set of resources (e.g., memory) within 912, such that a first set of processes (e.g., within default namespace 920) uses a first set of resources and a second set of processes (e.g., within inspection namespace 930) uses a second set of resources.

At block 1004, the security configurator clones properties of default namespace 920. In one embodiment, the security configurator determines and clones IP address 922, interface 924, and interface name 926 of default namespace 920, into inspection namespace 930 as IP address 932, interface 934, and interface name 936. In such embodiments, after cloning, the corresponding values of IP addresses and interface names for the default namespace 920 and inspection namespace 930 are identical. In some embodiments, the security configurator clones other default namespace properties, including, but not limited to, portions of routing tables, access control lists, and port settings.

At block 1006, the security configurator creates an overlay network (ONET) 940 in inspection namespace 930. The security configurator creates ONET 940 and creates forwarding database 942 tied to ONET 940. In one embodiment, server 912 uses ONET 940 as a dedicated pipeline for sending encapsulated network traffic (e.g., data packets) from server 912 to security service 952, and for receiving encapsulated network traffic to server 912 after security service 952 performs security operations on the network traffic.

At block 1008, the security configurator configures ONET forwarding database 942. In one embodiment, the security configurator configures ONET forwarding database 942 with instructions on how to handle incoming or received data packets. For example, the security configurator configures ONET forwarding database 942 to encapsulate data packets in response to receiving data packets from default namespace 920, or from applications 928 operating within default namespace 920, and transmits or directs the encapsulated data packets to security service 952. For example, ONET forwarding database 942 encapsulates the data packet and assigns an overlay ethernet header and UDP header to the encapsulated data packets, with a source IP address as IP address 932 of inspection namespace 930 and a destination IP address of IP address 954 of inspection namespace 950 in security service 952.

The security configurator also configures ONET forwarding database 942 to decapsulate encapsulated data packets in response to receiving encapsulated data packets from security service 952 and direct the decapsulated data packets to the appropriate destination (e.g., applications 928 in default namespace 920).

At block 1010, the security configurator creates namespace bridge 944. In one embodiment, the security configurator creates namespace bridge 944 by establishing a directive that all network traffic (e.g., from applications 928) in default namespace 920 directed to interface 924 be automatically forwarded to interface 934 and then to ONET 940 in inspection namespace 930.

In one embodiment, in a Linux environment, ONET 940 and bridge 944 between two namespaces (e.g., default namespace 920 and inspection namespace 930) are implemented using the example script shown in FIG. 11. The example script in FIG. 11 is for the selected interface "IFACE":

In the example script of FIG. 11, at line 1, the IP Address of the remote Security Service is defined. At lines 2-4, properties of the default namespace are identified. At lines 5-7, the inspection namespace is created with IPv6 disabled. At lines 8-23, the bridge is created and enabled. At line 24, a routing directive is added to the Inspection namespace forwarding database to route all traffic to the remote Security Service IP address "si".

At block 1012, ONET 940 transmits encapsulated server traffic (e.g., network traffic, data packets, etc.) from server 912 to security service 952. As described above, when ONET 940 receives data packets from default namespace 920 received by inspection namespace 930 via bridge 944, ONET 940 encapsulates the data packet using an encapsulation protocol and assigns an overlay ethernet header and UDP header to the encapsulated data packets. ONET 940 then transmits the encapsulated data packets to the appropriate destination, e.g., to security service 952 for security inspection. In one embodiment, security service 952 performs security processing on the data packets, and security service 952 returns encapsulated data packets back to server 912 via ONET 940.

Figure 12:
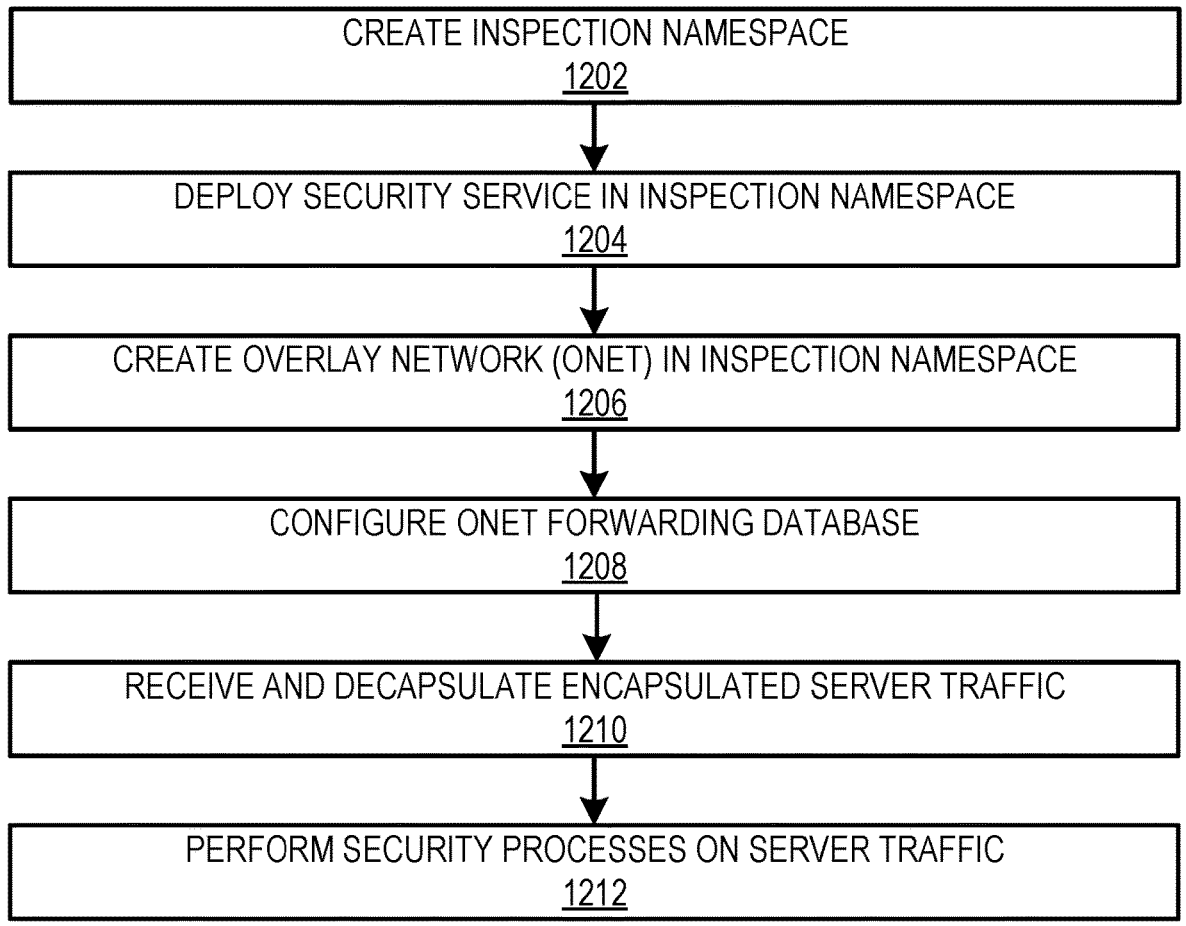
FIG. 12 is a flow diagram illustrating a process for performing security process on data packets received via an overlay network in accordance with an embodiment.

FIG. 12 is a flow diagram illustrating a process for performing security process on data packets received via an overlay network in accordance with an embodiment. For ease of understanding, the description of FIG. 12 below references components of the networked environments of FIGS. 1 and 9, however, it is not limited to those components. In other embodiments, a management microservice (e.g., microservice 108-122) receives instructions to perform the actions described below. Further, the actions below may be performed by one or more security microservices at the direction of a management microservice. As such, a single security microservice may perform an action, or two more security services may perform the action either independently, or in conjunction. Although FIG. 12 describes operations performed by a management microservice, some or all of the operations described in FIG. 12 can be performed by a configuration microservice, another type of microservice, an application, or any other computer-executable logic.

At block 1202, a management microservice in cloud environment 902 identifies inspection namespace 950. In one embodiment, inspection namespace 950 is an existing default namespace. In other embodiments, identifying inspection namespace 950 includes creating inspection namespace 950. For example, inspection namespace 950 can be a clone of a default namespace of a corresponding server (not pictured) hosting inspection namespace 950 or a newly created namespace.

At block 1204, the management microservice deploys security service 952 in inspection namespace 950. Services running within a server execute within the namespace they are assigned. In a typical server configuration, services execute within the default namespace unless otherwise directed. In one embodiment, the management microservice designates inspection namespace 950 for deployment of security service 952.

At block 1206, the management microservice creates overlay network (ONET) 956 in inspection namespace 950. In one embodiment, the management microservice creates ONET 956 and creates forwarding database 958 tied to ONET 956. In one embodiment, security service 952 uses ONET 956 as a dedicated pipeline for receiving encapsulated network traffic (e.g., data packets) from server 912 directed to security service 952, and for sending encapsulated network traffic to server 912 after performing security operations on the network traffic.

At block 1208, the management microservice configures ONET forwarding database 958. In one embodiment, the management microservice configures ONET forwarding database 958 with instructions on how to handle incoming or received data packets. For example, the management microservice configures ONET forwarding database 956 to decapsulate encapsulated data packets in response to receiving encapsulated data packets from ONET 940 in server 912. The management microservice further configures ONET forwarding database 956 to direct the decapsulated data packets to the appropriate destination (e.g., a system for performance of security processes or operations).

ONET 950 also encapsulates data packets in response to performing and/or completing security processes or operations on the data packets and transmits or directs the encapsulated data packets to server 912. For example, ONET forwarding database 958 encapsulates the data packets and assigns an overlay ethernet header and UDP header to the encapsulated data packets, with a source IP address of IP address 954 of inspection namespace 950 in security service 952 and a destination IP address of IP address 932 of inspection namespace 930.

At block 1210, the management microservice receives and decapsulates encapsulated server traffic (e.g., network traffic, data packets, etc.). In one embodiment, the management microservice receives the encapsulated server traffic from a first namespace in the source of the server traffic (e.g., inspection namespace 930 in server 912), where the first name receives the server traffic from a second namespace in the source of the server traffic (e.g., default namespace 920 in server 912) over a namespace bridge (e.g., bridge 944). In one embodiment, after receiving the encapsulated server traffic from ONET 940 in server 912, ONET 956 decapsulates the encapsulated server traffic on behalf of security service 952.

At block 1212, the management microservice performs security processes on the decapsulated server traffic. When security service 952 completes its security processes, the server traffic is encapsulated and directed from ONET 956 to the source of the server traffic (e.g., ONET 940 in inspection namespace 930 in server 912). In one embodiment, ONET 940 decapsulates the server traffic from security service 952 and forwards the decapsulated server traffic to interface 934, which forwards the decapsulated server traffic via namespace bridge 944 to interface 924 in default namespace 920.

In one embodiment, security service 952 sends the server traffic to an endpoint of the server traffic on behalf of server 912. In such embodiments, security service 952 can send the server traffic to an endpoint without encapsulating the server traffic by reusing the header information of the original encapsulated traffic. For example, forwarding database 958 can send the server traffic with the IP address of the intended endpoint as the destination IP address and the IP address of interfaces 922 as the source IP address. This can reduce the computing resources of server 912 by eliminating the steps of transmitting the encapsulated server traffic back to server 912 and server 912 sending the decapsulated server traffic to the intended endpoint.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 13:
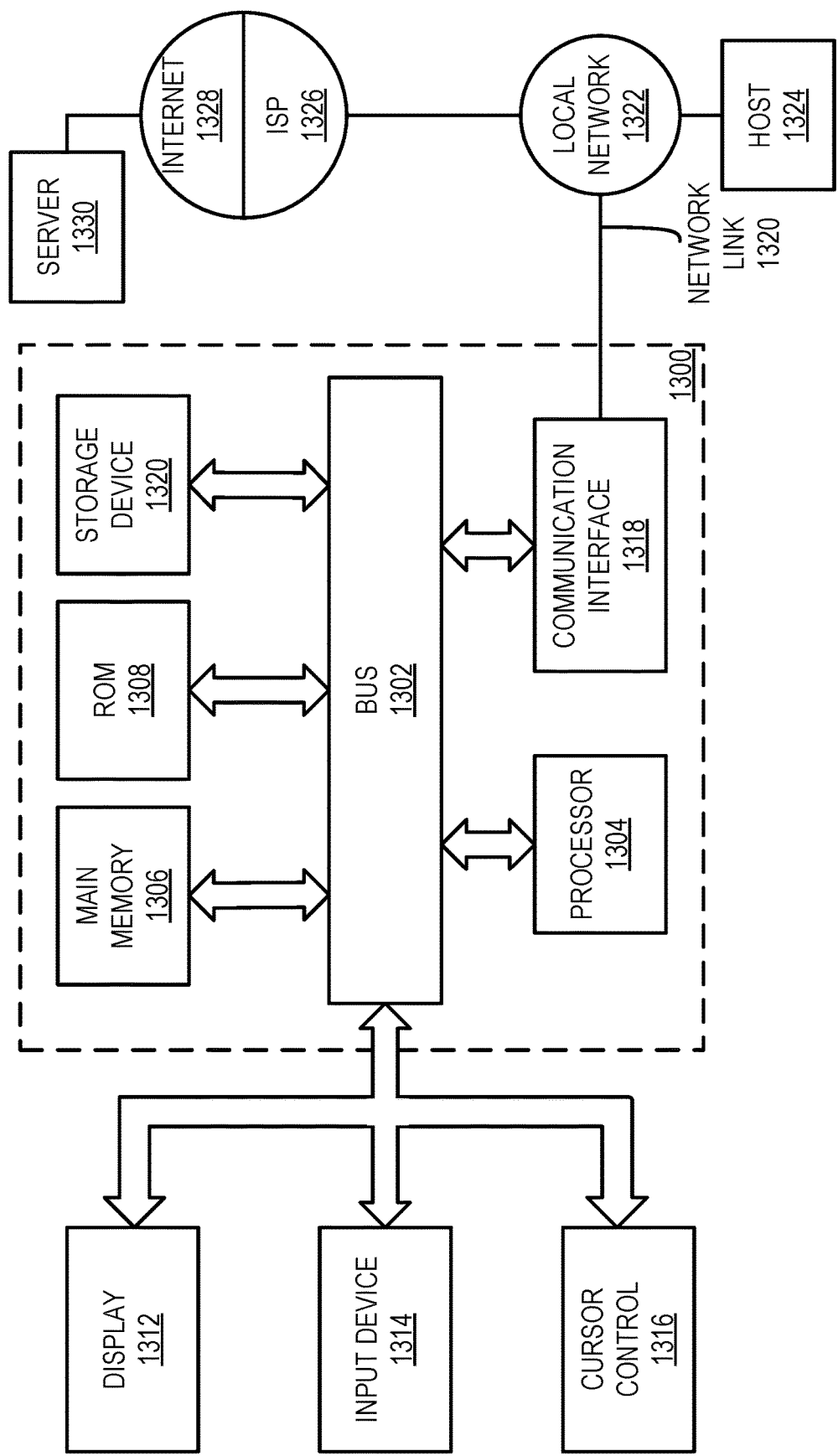
FIG. 13 is a block diagram that illustrates a computer system utilized in implementing the above-described techniques in accordance with some of the disclosed embodiments.

FIG. 13 is a block diagram that illustrates a computer system 1300 utilized in implementing the above-described techniques in accordance with some of the disclosed embodiments. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more buses 1302 or other communication mechanism for communicating information, and one or more hardware processors 1304 coupled with buses 1302 for processing information. Hardware processors 1304 may be, for example, general purpose microprocessors. Buses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random-access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1312.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In one embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in one embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As another example, the one or more communication interfaces 1318 may include a wireless network interface controller, such as an 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world-wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In one embodiment, computer system 1300 can send messages and receive data, including program code and/or other types of instructions, through the network(s), network link 1320, and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In one embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: a server computer creating an inspection namespace on the server computer. The method further comprises cloning namespace properties of a default namespace on the server computer to the inspection namespace, creating an overlay network in the inspection namespace connecting the server computer to a security service, and creating a namespace bridge between the default namespace and the inspection namespace. The method further comprises transmitting server traffic received via the namespace bridge to the security service using the overlay network and an encapsulation protocol, wherein the security service performs security processing on the server traffic.

In some embodiments, one or more of the following applies: 1) the method further comprises: configuring a routing directive for server traffic in the default namespace, wherein the routing directive causes the server traffic in the default namespace to be sent to the inspection namespace via a namespace bridge; 2) the cloned namespace properties of the default namespace include an IP address; 3) the method further comprises: configuring a forwarding database for the overlay network, wherein the forwarding database encapsulates the server traffic to include an overlay ethernet header and an IP header; and 4) the method further comprises: receiving encapsulated server traffic back from the security service via the overlay network after the security processing.

In some embodiments, one or more non-transitory computer-readable storage media store instructions which, when executed by one or more hardware processors, cause performance of a method comprising: a server computer creating an inspection namespace on the server computer. The method further comprises cloning namespace properties of a default namespace on the server computer to the inspection namespace, creating an overlay network in the inspection namespace connecting the server computer to a security service, and creating a namespace bridge between the default namespace and the inspection namespace. The method further comprises transmitting server traffic received via the namespace bridge to the security service using the overlay network and an encapsulation protocol, wherein the security service performs security processing on the server traffic.

In some embodiments, one or more of the following applies: 1) the method further comprises: configuring a routing directive for server traffic in the default namespace, wherein the routing directive causes the server traffic in the default namespace to be sent to inspection namespace via a namespace bridge; 2) the cloned namespace properties of the default namespace include an IP address; 3) the method further comprises: configuring a forwarding database for the overlay network, wherein the forwarding database encapsulates the server traffic to include an overlay ethernet header and an IP header; and 4) the method further comprises: receiving encapsulated server traffic back from the security service via the overlay network after the security processing.

In some embodiments, an apparatus comprises: one or more hardware processors; and memory coupled to the one or more hardware processors, the memory storing instructions which, when executed by the one or more hardware processors, cause the apparatus to: create an inspection namespace on the server computer. The instructions further cause the apparatus to clone namespace properties of a default namespace on the server computer to the inspection namespace. The instructions further cause the apparatus to create an overlay network in the inspection namespace connecting the server computer to a security service. The instructions further cause the apparatus to create a namespace bridge between the default namespace and the inspection namespace. The instructions further cause the apparatus to transmit server traffic received via the namespace bridge to the security service using the overlay network and an encapsulation protocol, wherein the security service performs security processing on the server traffic.

In some embodiments, one or more of the following applies: 1) the instructions further cause the apparatus to configure a routing directive for server traffic in the default namespace, wherein the routing directive causes the server traffic in the default namespace to be sent to the inspection namespace via a namespace bridge; 2) the cloned namespace properties of the default namespace include an IP address; 3) the instructions further cause the apparatus to configure a forwarding database for the overlay network, wherein the forwarding database encapsulates the server traffic to include an overlay ethernet header and an IP header; and 4) the instructions further cause the apparatus to receive encapsulated server traffic back from the security service via the overlay network after the security processing.

In some embodiments, a computer-implemented method comprises: identifying an inspection namespace for a server computer. The method further comprises deploying a security service in the inspection namespace. The method further comprises creating an overlay network in the inspection namespace. The overlay network is configured to encapsulate and transmit server traffic between the security service and a source of the server traffic. The method further comprises receiving encapsulated server traffic via the overlay network. The encapsulated server traffic originates from a first namespace in the source of the server traffic, and the first namespace receives the server traffic from a second namespace in the source of the server traffic. The method further comprises decapsulating the received encapsulated server traffic. The method further comprises performing security processes on the decapsulated server traffic.

In some embodiments, one or more of the following applies: 1) the inspection namespace is a default namespace for the server computer; 2) the method further comprises configuring a forwarding database for the overlay network, wherein the forwarding database encapsulates the server traffic to include an overlay ethernet header and an IP header; and 3) a product of the security service is transmitted to the source of the encapsulated server traffic.

In some embodiments, one or more non-transitory computer-readable storage media store instructions which, when executed by one or more hardware processors, cause performance of a method comprising: identifying an inspection namespace for a server computer. The method further comprises deploying a security service in the inspection namespace. The method further comprises creating an overlay network in the inspection namespace. The overlay network is configured to encapsulate and transmit server traffic between the security service and a source of the server traffic. The method further comprises receiving encapsulated server traffic via the overlay network. The encapsulated server traffic originates from a first namespace in the source of the server traffic, and the first namespace receives the server traffic from a second namespace in the source of the server traffic. The method further comprises decapsulating the received encapsulated server traffic. The method further comprises performing security processes on the decapsulated server traffic.

In some embodiments, one or more of the following applies: 1) the inspection namespace is a default namespace for the server computer; 2) the method further comprises configuring a forwarding database for the overlay network, wherein the forwarding database encapsulates the server traffic to include an overlay ethernet header and an IP header; and 3) a product of the security service is transmitted to the source of the encapsulated server traffic.

In some embodiments, an apparatus comprises: one or more hardware processors; and memory coupled to the one or more hardware processors, the memory storing instructions which, when executed by the one or more hardware processors, cause the apparatus to: identify an inspection namespace for a server computer. The instructions further cause the apparatus to deploy a security service in the inspection namespace. The instructions further cause the apparatus to create an overlay network in the inspection namespace. The overlay network is configured to encapsulate and transmit server traffic between the security service and a source of the server traffic. The instructions further cause the apparatus to receive encapsulated server traffic via the overlay network. The encapsulated server traffic originates from a first namespace in the source of the server traffic, and the first namespace receives the server traffic from a second namespace in the source of the server traffic. The instructions further cause the apparatus to decapsulate the received encapsulated server traffic. The instructions further cause the apparatus to perform security processes on the decapsulated server traffic.

In some embodiments, one or more of the following applies: 1) the inspection namespace is a default namespace for the server computer; 2) the instructions further cause the apparatus to configure a forwarding database for the overlay network, wherein the forwarding database encapsulates the server traffic to include an overlay ethernet header and an IP header; and 3) a product of the security service is transmitted to the source of the encapsulated server traffic.

What is claimed is:

1. A computer-implemented method comprising:
    creating, by a server computer, an inspection namespace on the server computer;
    cloning namespace properties of a default namespace on the server computer to the inspection namespace;
    creating an overlay network in the inspection namespace connecting the server computer to a security service;
    creating a namespace bridge between the default namespace and the inspection namespace;
    configuring a routing directive for server traffic, wherein the routing directive causes the server traffic to be sent via the namespace bridge; and
    transmitting server traffic received via the namespace bridge to the security service using the overlay network and an encapsulation protocol, wherein the security service performs security processing on the server traffic.

2. The computer-implemented method of claim 1, wherein the routing directive causes the server traffic in the default namespace to be sent to the inspection namespace via the namespace bridge.

3. The computer-implemented method of claim 1, wherein the namespace properties of the default namespace that are cloned to the inspection namespace include an IP address of the default namespace.

4. The computer-implemented method of claim 1, further comprising:
    configuring a forwarding database for the overlay network, wherein the forwarding database encapsulates the server traffic to include an overlay ethernet header and an IP header.

5. The computer-implemented method of claim 1, further comprising:
    receiving encapsulated server traffic back from the security service via the overlay network after the security processing.

6. One or more non-transitory computer-readable storage media storing instructions which, when executed by one or more hardware processors, cause performance of a method comprising:

creating, by a server computer, an inspection namespace on the server computer;

cloning namespace properties of a default namespace on the server computer to the inspection namespace;

creating an overlay network in the inspection namespace connecting the server computer to a security service;

creating a namespace bridge between the default namespace and the inspection namespace;

configuring a routing directive for server traffic, wherein the routing directive causes the server traffic to be sent via the namespace bridge; and transmitting server traffic received via the namespace bridge to the security service using the overlay network and an encapsulation protocol, wherein the security service performs security processing on the server traffic.

7. The one or more non-transitory computer-readable storage media of claim 6, wherein the routing directive causes the server traffic in the default namespace to be sent to the inspection namespace via the namespace bridge.

8. The one or more non-transitory computer-readable storage media of claim 6, wherein the namespace properties of the default namespace that are cloned to the inspection namespace include an IP address of the default namespace.

9. The one or more non-transitory computer-readable storage media of claim 6, further comprising:

configuring a forwarding database for the overlay network, wherein the forwarding database encapsulates the server traffic to include an overlay ethernet header and an IP header.

10. The one or more non-transitory computer-readable storage media of claim 6, further comprising:

receiving encapsulated server traffic back from the security service via the overlay network after the security processing.

11. An apparatus comprising:

one or more hardware processors;

memory coupled to the one or more hardware processors, the memory storing instructions which, when executed by the one or more hardware processors, causes the apparatus to:

create an inspection namespace on a server computer;

clone namespace properties of a default namespace on the server computer to the inspection namespace;

create an overlay network in the inspection namespace connecting the server computer to a security service;

create a namespace bridge between the default namespace and the inspection namespace;

configure a routing directive for server traffic, wherein the routing directive causes the server traffic to be sent via the namespace bridge; and transmit server traffic received via the namespace bridge to the security service using the overlay network and an encapsulation protocol, wherein the security service performs security processing on the server traffic.

12. The apparatus of claim 11, wherein the routing directive causes the server traffic in the default namespace to be sent to the inspection namespace via the namespace bridge.

13. The apparatus of claim 11, wherein the namespace properties of the default namespace that are cloned to the inspection namespace include an IP address of the default namespace.

14. The apparatus of claim 11, wherein the executed instructions further causes the apparatus to:

configure a forwarding database for the overlay network, wherein the forwarding database encapsulates the server traffic to include an overlay ethernet header and an IP header.

15. The apparatus of claim 11, wherein the executed instructions further causes the apparatus to:

receive encapsulated server traffic back from the security service via the overlay network after the security processing.

* * * * *